United States Patent [19]
Hornsby

[11] Patent Number: 5,523,854
[45] Date of Patent: Jun. 4, 1996

[54] STORE AND FORWARD DATA TRANSMISSION

[75] Inventor: Warren G. Hornsby, Cincinnati, Ohio

[73] Assignee: Transdata International, Inc., Milford, Ohio

[21] Appl. No.: 491,171

[22] Filed: Jun. 16, 1995

Related U.S. Application Data

[63] Continuation of Ser. No. 148,973, Nov. 8, 1993.

[51] Int. Cl.⁶ .................................................... H04N 1/00
[52] U.S. Cl. ........................ 358/407; 358/402; 358/403; 358/440; 358/442
[58] Field of Search ........................ 358/403, 402, 358/407, 442, 468, 400, 440, 434, 438

[56] References Cited

U.S. PATENT DOCUMENTS

| | | | |
|---|---|---|---|
| 4,994,926 | 2/1991 | Gordon et al. | 358/407 |
| 5,270,830 | 12/1993 | Suzuki | 358/400 |
| 5,327,253 | 7/1994 | Suzuki | 358/426 |
| 5,404,231 | 4/1995 | Bloomfield | 358/407 |
| 5,452,099 | 9/1995 | Von Meister | 358/407 |
| 5,459,584 | 10/1995 | Gordon et al. | 358/407 |

Primary Examiner—Edward L. Coles, Sr.
Assistant Examiner—Fan Lee
Attorney, Agent, or Firm—Wood, Herron & Evans

[57] ABSTRACT

A store and hold communications system for storing data files and associated notification messages created at a plurality of first locations. The data files and associated notification messages are automatically and selectively transmitted and stored in remote data stores at a remote location. The remote data stores are associated with a plurality of second locations. Facsimile copies of the notification messages are automatically sent to selected second locations corresponding to the intended recipients of the data files stored in the remote data stores. In response to receiving the facsimile copy of the notification message, the selected second locations initiate a communications link with the remote location to retrieve the stored data files from the remote data store at the remote location associated with the selected second locations.

15 Claims, 4 Drawing Sheets

STORE AND FORWARD DATA TRANSMISSION

This application is a continuation of prior application Ser. No. 08/148,973 filed Nov. 8, 1993.

BACKGROUND OF THE INVENTION

1. Field of the Invention

The present invention relates generally to the transfer of electronic data files between remote locations, and more particularly, to a communications system providing a more efficient transfer of electronic data files from a plurality of first locations to selected ones of a plurality of second locations.

2. Description of Related Art

Within the publishing industry, the transfer of information between advertising agencies and publishers is typically a process fraught with inefficiencies. A newspaper, for example, must have its display ads in its possession at least 24 hours before the newspaper is printed. Further, a typical newspaper will utilize advertising agencies located throughout the U.S., and in some cases, in foreign countries. Display ads, that is, those ads that typically contain some graphic material, are most often physically delivered to the newspaper as hard copy, that is, on paper, by an overnight courier. Therefore, the advertising agency must have the display ad completed 48 hours before the newspaper goes to print.

In the case of a Sunday newspaper edition, for example, typically, the newspaper must have the display ads in its possession by 5:00 p.m. the prior Friday. To meet that 5:00 p.m. Friday deadline, the advertising agency must delivery those display ads to a courier by 7:00 p.m. the preceding Thursday. Depending on its size, a Sunday edition of the newspaper may have anywhere from several hundred to several thousand display ads. Therefore, the physical handling of this large volume of material presents a problem for the newspaper.

In addition, the advertising agency generally will be phoning the newspaper prior to the 5:00 p.m. Friday deadline to confirm that the display ad has been received. Often that information is not readily known, and the newspaper will have to use a person to telephone or telecopy the advertising agencies to confirm receipt of their display ads. The above is a hectic and inefficient process for delivering display ads from the advertising agencies to the newspaper publisher. Further, since the display ad is delivered as hard copy, that is, reproduced on a sheet of paper, additional handling may be required by the newspaper. For example, it may be necessary to electronically scan the hard copy display ad to produce an electronic file. Alternatively, the newspaper may have to create negative or positive film of the hard copy display ad prior to use.

Some publishers utilize a bulletin board on a computer network and assign passwords to their advertising agencies. The advertising agencies then transmit electronic files of the display ads to the bulletin board, and the newspaper downloads those files to other storage areas or its printers. Display ads typically contain graphic material, and therefore, the corresponding electronic binary files are relatively large. Even though data compression programs are available, they must be separately executed and may or may not be used. Uncompressed display ad files require a relatively long time to both transmit the ads from the advertising agency to the bulletin board and from the bulletin board to another location associated with the newspaper. In those situations where thousands of display ads must be received within several hours, multiple computer terminals and phone lines may be required, and many publishers have determined the required investment, labor and on-going expense of such a system is not practical.

The above bulletin board systems have the further disadvantage of being unique and different for each publisher. Consequently, an advertising agency must learn different commands and protocols in order to use the bulletin boards of different publishers. The complexity of that exercise often results in the advertising agency preferring to use the overnight courier delivery service. Therefore, such bulletin board systems do not permit advertising agencies to access multiple publishers with a single system. Further, the advertising agency will seek an independent confirmation that the display ad has been received by the publisher.

In summary, all of the existing display ad transfer processes have significant inefficiencies and disadvantages to both the advertising agency and the publisher.

SUMMARY OF THE INVENTION

To overcome the disadvantages described above, the present invention provides a data communications system in which electronic data files are efficiently transmitted from one or more sources to a remote data store; and thereafter, the electronic data files are retrieved from the remote store by selected recipients. Further, the invention delivers an automatic notification to the selected recipients that a data file transfer to the remote data store has occurred. Therefore, the invention is particularly useful in those situation in which numerous sources must send various electronic files to a second plurality of recipients from a single source; and the invention is especially well suited for transferring various display ads to selected publishers from a plurality of advertising agencies.

According to the principles of the present invention and in accordance with the described embodiments, a method and apparatus are provided for transferring data files from a plurality of first locations, for example, ad agencies, to a remote location from which the data files can be retrieved by a selected plurality of second locations for example, publishers. Each of the ad agencies has a computer and modem; and an operator uses the computer to create a data files comprising display ads and notification messages which are associated with selected publishers. Next, the operator commands an upload cycle in which the computer automatically and sequentially reads and compresses the data files and uses the modem to transmit the data files from the ad agency to remote stores associated with the various publishers at the remote location. Each of the publishers has a computer with a modem; and subsequently, the selected publishers command the execution of a download cycle which transfers the compressed data files in their respective remote store to their respective computers. The compressed data file is then decompressed and stored.

The execution of the upload cycle by the ad agency automatically delivers a facsimile copy of a notification message to the selected publishers. The notification message identifies the data file, its size, the identity of the originating ad agency and the time and date that the data file was uploaded by the ad agency to the remote store. Upon downloading the batch of compressed data files, a download confirmation is sent back to each of the ad agencies from which the display ads originated.

The data communications system of the present invention has the fundamental advantage of permitting one of a plurality of first locations, for example, one of several advertising agencies, to communicate with a selected plurality of second locations for example, selected publishers using a common system. The automatic compression and decompression of the data permits the transfer to occur more efficiently and economically. Further, the advertising agency does not have to transmit the display ad to the publisher until the day of the deadline; and consequently, more up-to-date information is available. Another advantage is that the data communications is typically more reliable than physical delivery systems which prevents loss of ads and revenue from a delivery service failure.

A further advantage of the communications system is that the selected publishers are automatically notified that a display ad, or data file, has been transmitted to the remote store by the advertising agency. The advertising agency is automatically notified that the publisher has received the display ad. Therefore, the time consuming and inefficient process of manually confirming the receipt of a display ad by telephone or telecopy is eliminated. In addition, by receiving the display ad as an electronic file, the publisher may be able to eliminate one or more manual handling steps of either scanning the hard copy of the display ad into its system or entering it by a photographic process. The communications system provides the further advantage that the notification can be sent to a recipient within the publisher who is different from the recipient of the display ad.

These and other objects and advantages of the present invention will become more readily apparent during the following detailed description together with the drawings herein.

DETAILED DESCRIPTION OF THE INVENTION

Figure 1:
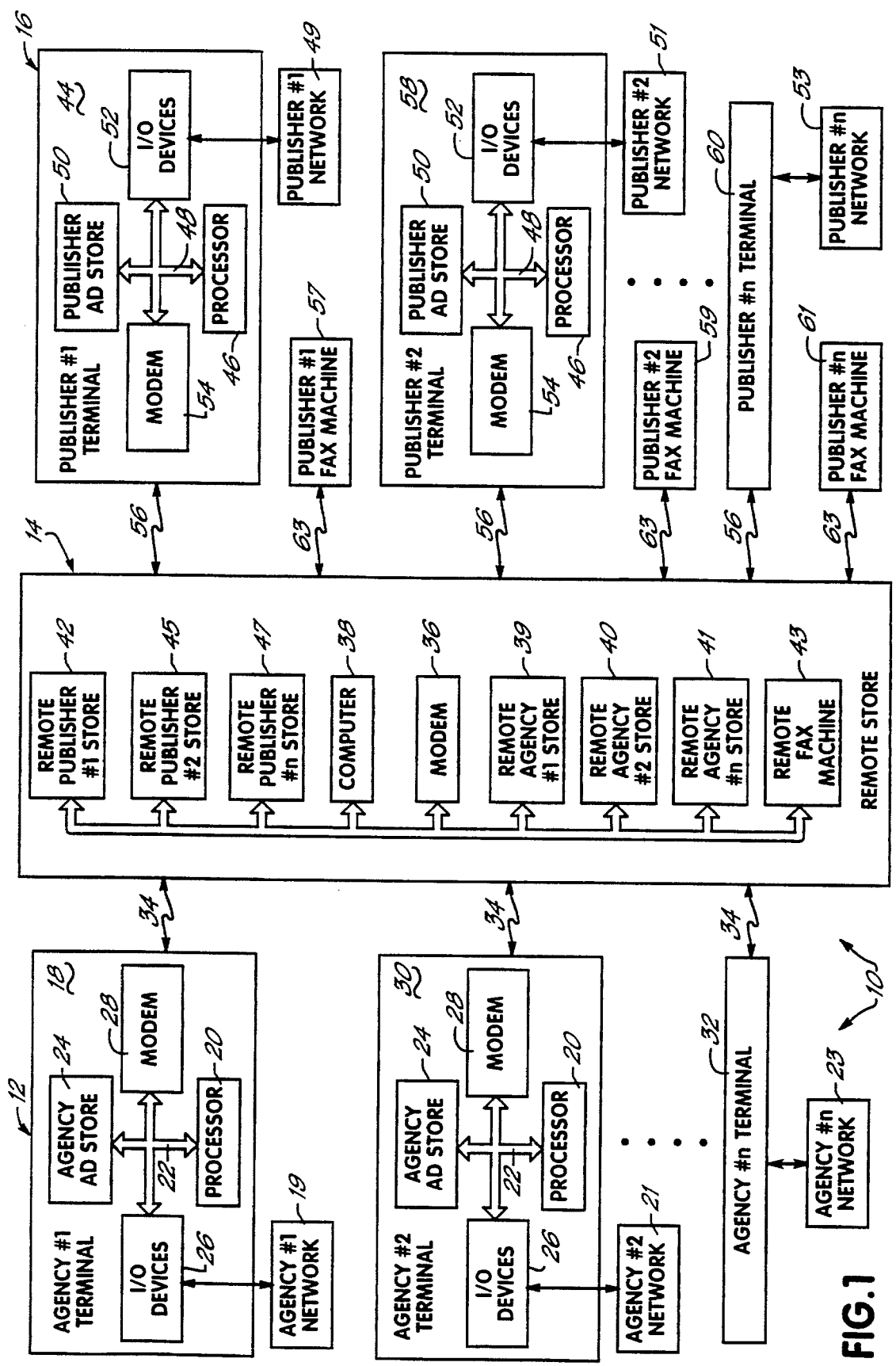
FIG. 1 is a schematic block diagram illustrating the components utilized with the present invention.

FIG. 1 is a schematic block diagram of a communications system 10 implementing the present invention. The communications system 10 has three basic components, a plurality of data file originators, for example, ad agencies 12 at a first location, a remote communications and storage system 14 at a remote location geographically separated from the agencies 12, and a plurality of data file users, for example, publishers 16 at a second location geographically separated from the agencies 12 and the remote communications and storage system 14. Each of the ad agencies 12 and publishers 16 can at any time initiate electronic exchange of data with the remote communications and storage system 14, but within the context of the disclosed system, an agency cannot electronically transfer data directly into a computer system of a publisher.

Each of the ad agencies has a computer based terminal, for example, a personal computer, 18. In a typical agency, binary display ad files containing graphic materials are created by computer equipment (not shown) which is connected to the agency's electronic communications network 19. Therefore, the terminal 18 has access to the display ad file through the agency computer network 19. In the absence of an agency computer network, the functions of the agency terminal 18 may be loaded in the agency computer used to create the display ad file. Alternatively, a floppy disk is physically carried to and the display ad file is loaded in from the floppy disk. The computer terminal 18 includes a processor 20 which is operably connected by an internal bus 22 to an agency ad and data store 24. The terminal 18 also includes input/output (I/O) devices 26, such as a keyboard, mouse, monitor, printer and network interface. Another I/O device within the computer terminal 18 is a modem 28. As indicated by a second agency terminal 30, all other agencies in the communications system 10 will have a personal computer terminal with substantially the same components as terminal 18. Terminal 32 symbolically represents that any number of other ad agencies can be included within the communications system 10.

Each of the terminals of the ad agencies 12 is in electrical communication with the remote communications and storage system 14. The communication is accomplished by the modems 28 which utilize a communications link 34, for example, a phone line or other data carrier, to communicate with one or more modems 36 within the remote storage system 14. Any other communication mechanisms may be used which can transfer electronic data files. The operation of the remote storage system 14 is under control of a remote computer 38 which may be a personal computer with the same basic components as the computer terminal 18. Operably connected to the remote computer 38 in the remote store 14 are a number of in-baskets, i.e., remote agency data stores, 39, 40, 41 associated with a respective one of the plurality of agency terminals 18, 30, 32, The remote communications and storage system 14 has a remote facsimile machine 43 which under the control of the remote computer 38 is capable of delivering facsimile copies to other facsimile machines. For purposes of this disclosure, a facsimile machine is also known as a telecopy or fax machine.

A first publisher has computer based terminal, or personal computer, 44 which contains generically identical hardware as previously described with respect to the agency terminal 18. A processor 46 is operably connected by means of an internal bus 48 to a publisher ad and data store 50. I/O devices 52 provide for operator inputs and output displays for the terminal 44, and a modem 54 communicates over communications links 56 with modem(s) 36 in the remote communications and storage system 14. If a second publisher is brought into the communication system 10, it will have a terminal 58 with identical components as that described with respect to terminal 44. As indicated by terminal 60, any number of publishers may be connected to the communication system 10. Each of the publishers has a facsimile machine 57, 59, 61 which receive facsimile copies from the remote facsimile machine 43 in the remote storage system 14. The facsimile machines communicate over communications lines 63 which preferably are phone lines, but any other data file communications link can be used. The publisher's terminals 44, 58, 60 have a corresponding number of publisher in-baskets, i.e., respective remote publisher data stores, 42, 45, 47 in the remote communications and storage system 14. Further, the terminals 44, 58, 60 may be connected to respective publisher networks 49, 51, 53 so that the downloaded display ad files are available to other systems of the publishers.

Figure 2:
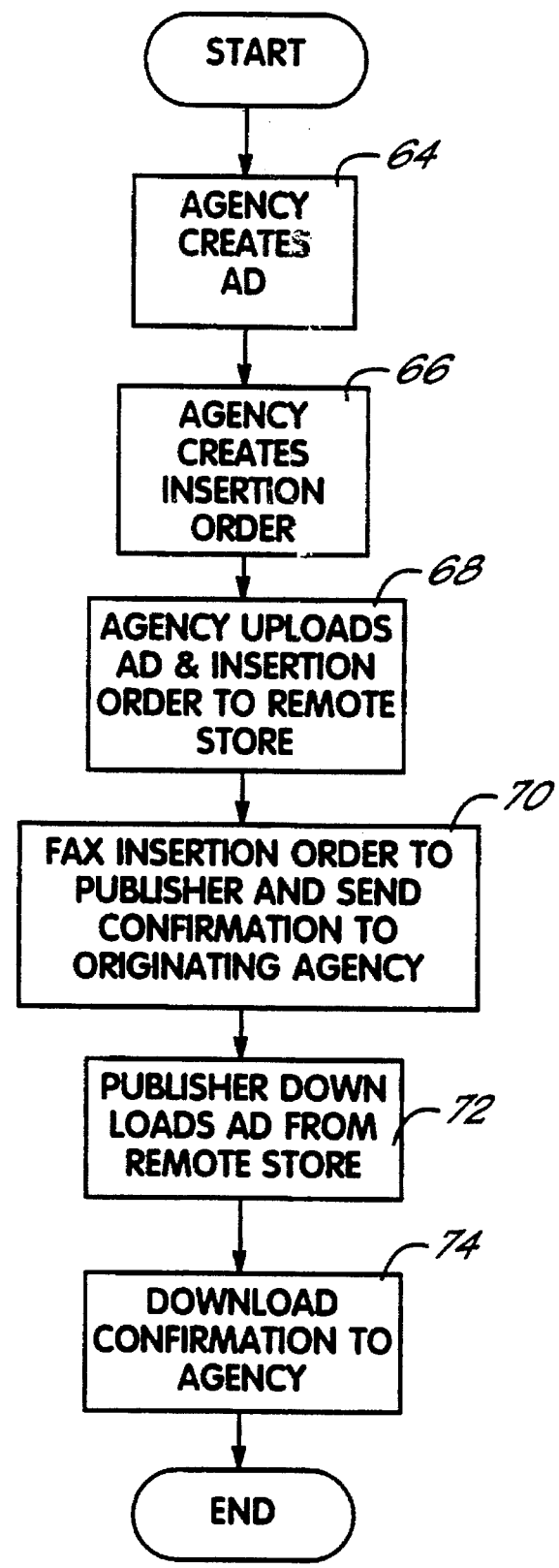
FIG. 2 is a flow chart illustrating the overall procedure used by the data communications system of the present invention.

Referring to FIGS. 1 and 2, the general operation of the communications system 10 will be described. At step 64, each of the agencies independently creates display ad files using known systems; and the display ad files are available to the computer terminals 18, 30, 32 through respective agency networks 19, 21, 23. At any time prior to the publication deadline, per process step 66, operators of the terminals 18, 30, 32 utilize I/O devices 26, such as a keyboard, video terminal and mouse, to create insertion order files associated with each display ad file. Typically, an insertion order contains an order number, the name of the publisher to whom the ad is to be sent, the full identification of the ad agency, the identity of the client hiring the ad, the proposed ad publication date, the size of the ad, the preferred general placement of the ad within the publication, the line rate charge of the publisher, the total cost and any special instructions. Insertion orders are created for each pending unique ad-publisher combination and are also used as notification messages with the present invention.

After one or more of the insertion orders are created for a particular agency, at step 68, the operator of the terminal 18, 30, 32 for that agency uses I/O devices 26 to initiate a send ad program. The send ad program executes an upload cycle of operation which transfers, i.e., transmits or uploads, the display ad and insertion order files to the remote storage system 14 using the modems 28, 36 and communications link 34. The display ad files are loaded into the remote publisher data stores 42, 45, 47 of the publishers identified in the insertion orders associated with the display ad files. In addition, the process, at step 70, delivers to those publishers respective notification messages which are facsimile copies of the insertion orders associated with each of the display ad files stored in their respective remote stores. The facsimile copy of the insertion order can be delivered to a recipient or location, e.g., the sales department, within the publisher that is different from the destination of the display ad file itself, e.g., the composition room. Contemporaneously with the transmission of the facsimile copy of the insertion order to a publisher, an insertion order, i.e., notification message, confirmation is automatically transferred to the appropriate remote agency store 42, 45, 47 of the agency originating the display ad file, The insertion order confirmations provide notice to the agencies uploading display ad files that the facsimile copy of the insertion order has been delivered to the publishers.

By automatically transmitting a facsimile copy of the insertion order to the publisher, the agencies 12 which do not have direct access to the publisher's terminals 44, 58, 60 can unilaterally communicate with the publishers 16. Therefore, with the facsimile copy of the insertion order, the agencies 12 deliver a message to the publishers 16 contemporaneously with the agencies forwarding a display ad files to the remote storage system 14. Exclusive of the facsimile communication, the publishers can only determine if an ad file is available by making random inquiries to the remote storage system 14; and therefore, the facsimile notification eliminates those unnecessary inquiries. The facsimile copy of the insertion order also includes the time and date the ad file was uploaded into the remote publisher's data stores 42, 45, 47.

Upon receiving the facsimile copy of the insertion order, the publisher knows that an ad file has been loaded in its remote storage system 14. Therefore, at process step 72, the publishers execute a receive ad program in their terminals 44, 58, 60. The receive ad program executes a cycle of operation which uses the modems 36, 54 and communications link 56, to download the display ad file from their respective remote publisher stores 42, 45, 47 to their publisher ad store 50. Pursuant to step 74, the process automatically transfers a download confirmation in the remote agency data stores 39, 40, 41 of the agencies originating the display ad files. The download confirmations provide notice to the agencies that the publishers have downloaded the agencies' display ad files. The download confirmation includes the identifying number of the insertion order, the time and date the display ad data file was downloaded by the publisher and the identity of the publisher.

At different and random times, all of the ad agencies 12 use their terminals 18, 30, 32 to transmit insertion orders and associated display ad files to the remote storage system 14 which are stored in the appropriate remote publisher stores 42. Based on the facsimile notifications, at different and random times, the publishers 16 download their respective stored display ad files for further processing and publication. The insertion order and download confirmations stored in the remote agency stores 40 are downloaded to the respective agencies 12 during subsequent upload transmissions of display ads by the agencies.

The modem(s) 36 within the remote storage system 14 are set to the host receive mode. In the host receive mode, the modem(s) 36 can be accessed by any other modems which transmit the correct phone numbers, passwords and other communications protocol. Consequently, the remote storage system is subject to unauthorized access. In contrast, the agency and publisher modems 28, 54 are set to the dial out mode. In that mode, the modems 28, 54 will not recognize an incoming call and therefore, cannot be remotely accessed. Consequently, data transfers between the terminals of the agencies 12 and publishers 16 and the remote storage system 14 can only occur if the agency or publisher initiates the communication with the remote storage system 14. Therefore, the terminals 18, 44 have the highest level of security and unauthorized remote access is impossible.

Figure 3:
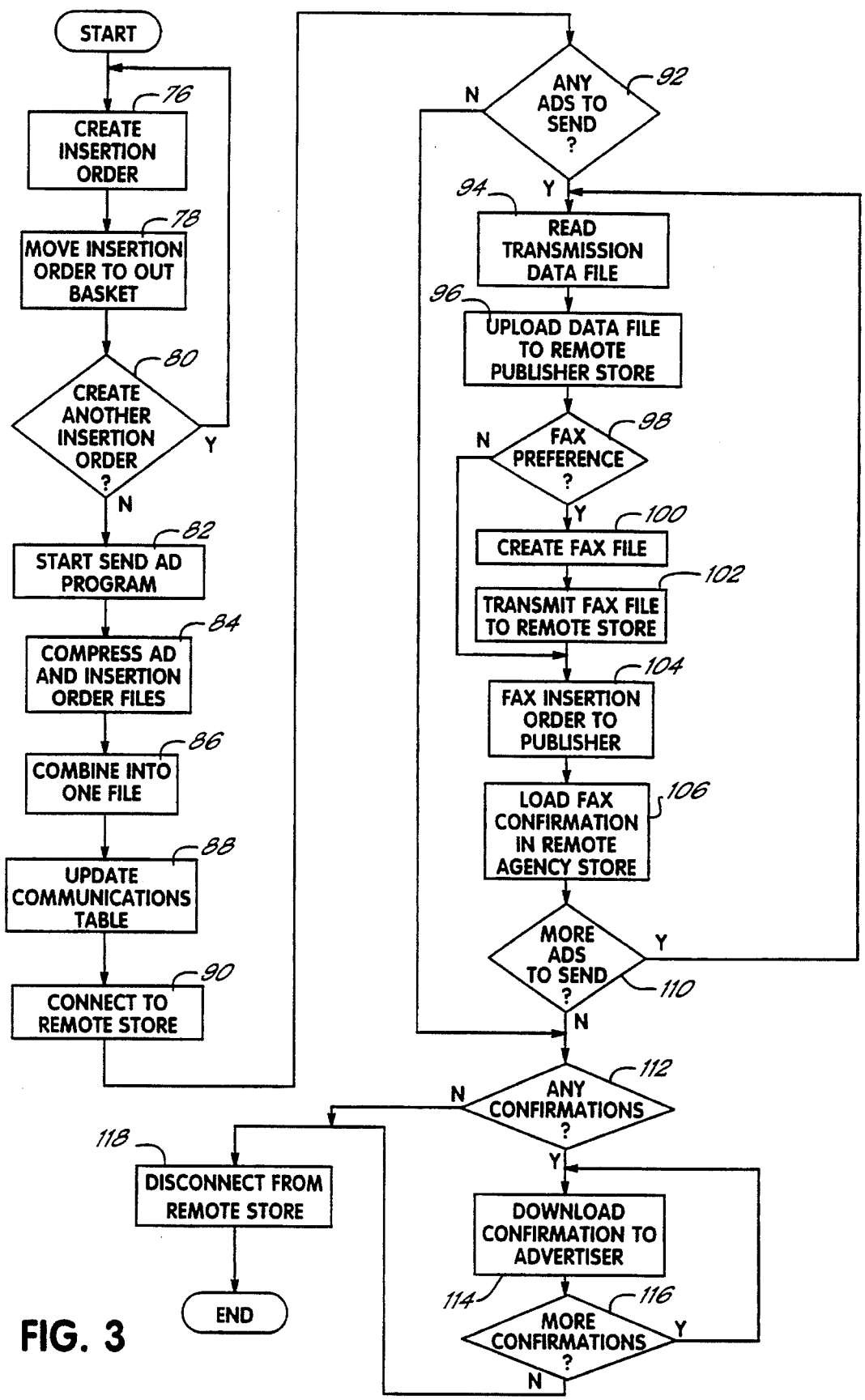
FIG. 3 is a flow chart illustrating the procedure of the invention used by the originator of a file.

Referring to FIGS. 1 and 3, the detailed procedure by which the ad agencies 12 operate within the communication system 10 will be described. The process of FIG. 3 is implemented by a program running in the processors 20 of the terminals 18, 30, 32 of the agencies 12. The program is designed to lead the operator of the terminal through the procedure. After the display ad files are created, using ad agency terminal 18 as an example, at process step 76, an operator uses a terminal 18 to create an insertion order file associated with a particular display ad file. The operator at step 78 transfers the insertion order file to an output buffer, such as an out-basket, within the agency ad store 24 or another memory location within the terminal 18. At step 80, an inquiry is made to the operator to determine whether another insertion order file is to be created. If so, the process at steps 76 and 78 is repeated until all of the insertion orders files have been created and moved to the output buffer store. Thereafter, at process step 82, the operator of the terminal 18 initiates a send ad routine or program the purpose of which is to upload the display ad and insertion order data files to the remote storage system 14. At step 84, the process automatically initiates a command to compress the insertion order files and the display ad files associated with the respective insertion order files. Next, at step 86, each compressed display ad file and associated insertion order file is combined into a single compressed transmission data file, The time efficient transmission of data files between the terminal 18 and the remote storage system 14 requires numerous pieces of data. So that the required data is readily available to the communications program, a communications data table is established within the terminal 18 which contains all of the information required for efficient communications. For example, information such as the publishers names, the identity, i.e. addresses, of the remote publisher data stores 42, 45, 47 within the remote storage system 14, the baud rate of the modems 28, the passwords to access the remote communications and storage system 14, the preference of whether a facsimile notification is to be sent, the address of the remote agency store 39, etc. Pursuant to step 88, the process automatically updates the information within the communications data table.

Next, at process step 90, the send ad program automatically utilizes the proper passwords and protocol to login and to connect modems 28, 36 thereby establishing the communications link 34 between the agency terminal 18 and the remote communications and storage system 14. Thereafter, at step 92, the process automatically determines whether there is a display ad file to be sent to the remote storage system 14. Since transmission and insertion order data files exist, the process at step 94 reads a first transmission data file comprised of a combination of a compressed display ad file and a compressed insertion order file and other information such as the address code of the remote publisher store in which the first transmission data file is to be stored. The identity of the specific transmission data file to read is established by the communications data table. At process step 96, the first transmission data file is transmitted from modem 28 in the agency terminal 18 across the transmission link 34 to modem(s) 36 in the remote storage system 14. Under control of remote computer 38, the first transmission data file is written into the appropriate one of the remote publisher data stores 42, 45, 47. Within the agency's terminal, the first transmission data file is then moved to a waste basket subdirectory within the agency ad store 24. The location of the transmission data files in the waste basket subdirectory indicate that they have been transmitted to the remote storage system 14 and may be deleted at the option of the user of the terminal 18.

By inquiry into the communications data table, at step 98 the process determines whether the facsimile preference option has been selected, The option of a facsimile preference is used for setup, diagnostic and maintenance purposes. The preferred embodiment of the present invention requires that the facsimile preference is always chosen. Therefore, at process step 100, the uncompressed insertion order file which is functioning as a notification message is read and combined with the recipient publisher's facsimile number to create a facsimile file. The recipient publisher's facsimile number is determined by reading the publishers name from the communications data table and retrieving the publisher's facsimile number from the publisher's list. The publisher's list contains all setup or initialization information for that publisher including its facsimile number. The current facsimile number for the publisher is copied from the publisher's listing and used in the facsimile file. The facsimile file also includes a flag designating a facsimile transmission. At step 102, the facsimile file is transmitted from the terminal 18 to the remote storage system 14. Per step 104, the remote computer 38 reads the facsimile file and transfers the publisher's facsimile number and the insertion order information to the remote facsimile machine 43 which dials the publisher's facsimile number and transmits a facsimile copy of the insertion order to the publisher's facsimile machine 57. The facsimile copy of the insertion order is sent to the publisher as a notification message identifying the transmission data file in the remote store 42. At step 106, a facsimile confirmation is loaded into the remote agency store 39. If at step 98, the program determines that the facsimile preference has not been chosen, then process steps 100, 102 and 104 are skipped; and the process at step 110 determines whether another transmission data file is to be transmitted from the terminal 18 to the remote storage system 14. If so, process steps 94 through 104 are repeated and iterated until all the transmission data files identified in the communications table have been uploaded to the remote storage system 14.

At process step 112, the send ad program running in terminal 18 checks to determine whether there are confirmations within its remote agency data store 39. If so, at step 114, a confirmation is read from the remote agency store 39 and transmitted across the communications link 34 between the modems 36, 28. The confirmation is received by the terminal 18 and stored in the agency ad store 24. Thereafter the process at step 116 determines whether another confirmation is in the remote agency store 39. If so, process steps 114, 116 are iterated until all confirmations have been downloaded from the remote agency data store 39 to the agency ad store 24. At that point, per step 118, the terminal 18 is automatically disconnected from the remote storage system 14 by terminating the communications link 34 between the modems 28, 36. The disconnect process of step 118 is also executed if the process step 112 determined that the remote agency store 39 contained no confirmation messages to be downloaded. The disconnection of the terminal 18 from the remote storage system 14 ends the send ad program being executed in the terminal 18. The process of FIG. 3 may be executed at any time by any or all of the agency terminals 18, 30, 32.

Figure 4:
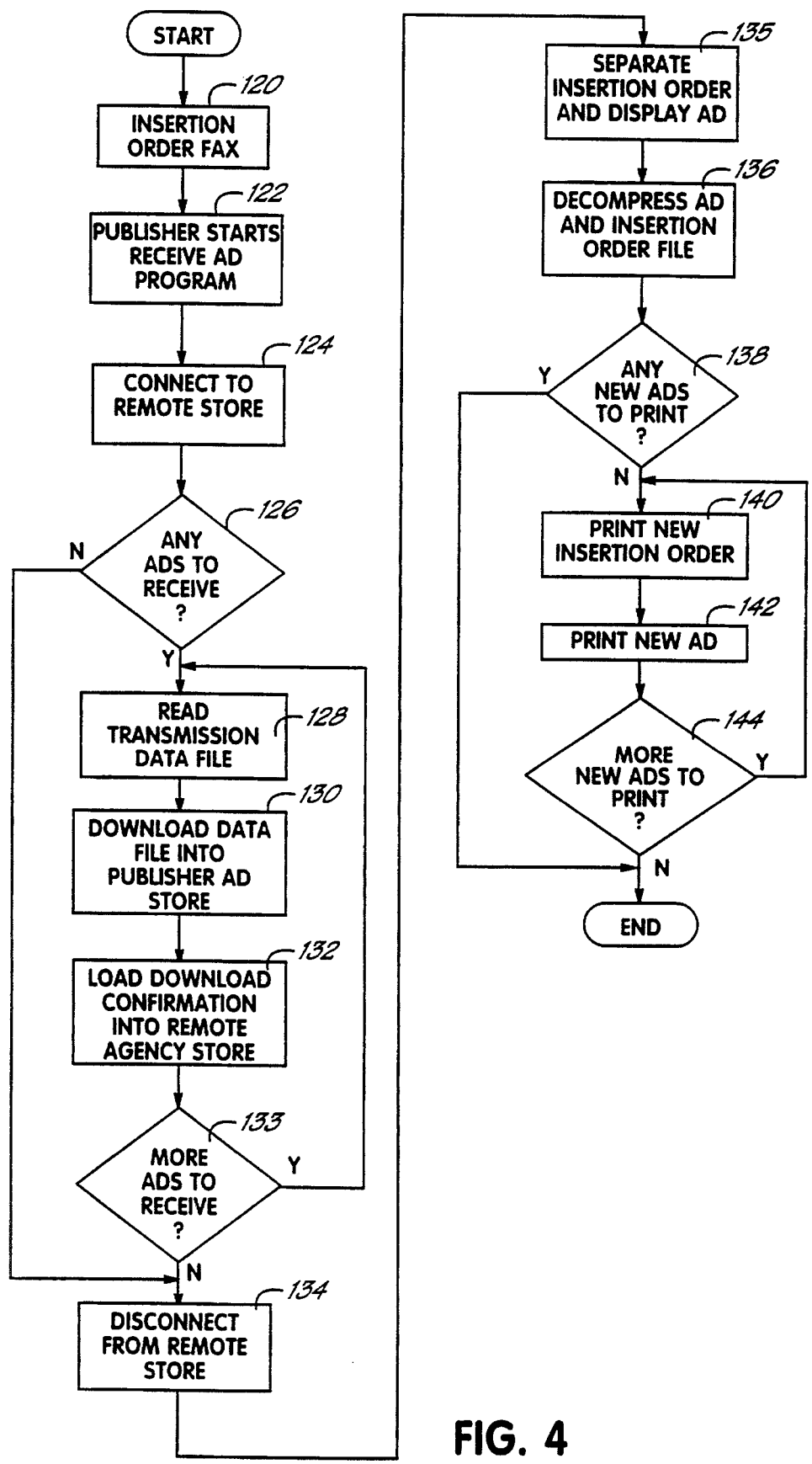
FIG. 4 is a flow chart illustrating the procedure used by the recipient of a file.

Referring to FIGS. 1 and 4 the detailed procedure by which the publishers operate within the communication system 10 will be described. The process of FIG. 4 is implemented by a computer program which runs in the processors 20 of the terminals 44, 58, 60 of the publishers 16. Prior to executing the program, one or more of the publishers receives insertion orders via their respective facsimile machines 57, 59, 61 advising them that an agency has uploaded a display ad to the publishers remote data store 42, 45, 47. In response to receiving the facsimile copy of the insertion order or at any other random time, the publisher uses I/O devices 52 to command the start of the receive ad program pursuant to step 122. Using publisher terminal 44 as an example, the program is designed to lead the publisher through the procedure. Next, at process step 124, the program automatically utilizes the proper passwords and protocol to login to the remote communications and storage system 14 by electrically connecting the modems 36, 54 thereby establishing the communications link 34 between the publisher terminal 44 and the remote communications and storage system 14.

At step 126, the process automatically determines whether there is a transmission data file for a display ad to be downloaded from the remote storage system 14. Since a facsimile copy of the insertion order was received by the publisher, a transmission data file does exist in the remote publisher store 42; and at process step 128, the stored transmission data file is read by the remote computer 38 from the remote publisher store. At process step 130, the transmission data file is transmitted from modem(s) 36 in the remote storage system 14 across communication link 56 to the modem 54 in the publisher terminal 44 and written into the publisher ad store 50. At process step 132, a download confirmation is loaded into the originating remote agency store 39. The process at step 133 determines whether another transmission data file is to be downloaded to the publisher's terminal 44. If so, process steps 128–133 are repeated and iterated until all transmission data files stored in the remote publisher store 42 have been downloaded to the publisher's terminal.

If, at process step 126, it is determined that no transmission data files are in the remote publisher store, the process steps 128–133 are skipped; and the process moves to step 134 which disconnects the publisher terminal 44 from the remote communication and storage system 14 by terminating the communications link 56 between modems 36, 54. Thereafter, at step 135, the process automatically separates the compressed insertion order file and the compressed display ad file which were combined into the downloaded transmission data file. At process step 136, the receive ad program automatically initiates a command to decompress the compressed display ad file and the compressed insertion order file associated therewith. The process at step 138 determines whether there are any downloaded display ad and insertion order files to print. If so, the process at step 140 utilizes a printer included within the I/O devices 52 within the publisher's terminal 44 to print the downloaded insertion order at process step 140 and display ad at process step 142. The process at step 144 determines whether there are additional files to print; and if so, process steps 140–144 are iterated until all files are printed. The process of FIG. 4 may be executed at any time by any or all of the publisher terminals 44, 58, 60.

The computer terminals, remote store and communications system and associated software programs can take many forms. For example, the processors 20, 46 may be a DOS based computer running WINDOWS® 3.1 software and which includes at least one microprocessor, for example, an Intel 486 DX 25 with 4 MB of RAM. The data stores 24, 50 may be a hard disk or other storage medium. Each set of I/O devices 26, 52 include a display monitor, a keyboard, a mouse and a network interface, if used. The publisher I/O devices 52 also include a laser postscript printer with a 600 dpi resolution. Alternatively, any or all of the terminals 18, 30, 32, 44, 58, 60 can be equivalent "MACINTOSH®" computers, for example, a 68030 based system running operating system 6.07 with at least a 16 MHz clock and 4 MB of RAM, a hard disk, super drive, and a mouse or pointer. To reduce communications costs, it is generally preferable to have the highest speed modem; and a modem baud rate of 9600 bps is typical. The communications and storage system 14 can be implemented using the commercial service of "COMPUSERVE" telecommunications services. The remote computer 38 within the remote communications and storage system 14 is connected with its associated devices using data buses, serial links and other appropriate data transfer mechanisms. The remote computer 38 is operably connected to the modem(s) 36 to control the transfer of data files between the modem(s) 36 and the remote agency and publisher stores. The remote computer 38 is operably connected to the remote fax machine 43 to initiate at the appropriate time the transmission of a facsimile copy of the insertion order to the publisher facsimile machines. Utility programs and routines for using the remote computer 38 to transfer data files between the remote stores, the modem(s) 36 and the facsimile machine 43 are known and commercially available.

The send ad program and the receive ad program may be created for either the DOS based "WINDOWS®" or the "MACINTOSH®" operating systems and computers, and files can be exchanged therebetween using a compatible file format. For example, the display ad files may be created in an EPS file format; and the insertion order files and other text files may be created in an ASCII file format. The communications functions in the send ad and receive ad programs can be implemented by using a version of the "COMPUSERVE®" "T-MAIL" Communications system for DOS based computers or the "COMPUSERVE®" "AD-MAIL" communications system for "MACINTOSH®" computer order facsimile transmission may be implemented with the "COMPUSERVE®" facsimile service. The compression process at process step 84 may be implemented with the "PKZIP" program for DOS based computers or the "ZIPIT" program for "MACINTOSH®" computers. The decompression process of process step 136 may be implemented with the "PKUNZIP" program for DOS based computers or the "UNZIPIT" program for "MACINTOSH®" computers. The "PKZIP" and "PKUNZIP" programs are commercially available from PK Ware of Brown Deer, Wis. The "ZIPIT" and "UNZIPIT" programs are commercially available from Thomas Brown of Forest Park, N.Y. The source code for the send ad and receive ad programs is written using an appropriate version of the "FOXBASE®" database program and is attached hereto as Appendices 1 and 2, respectively.

While the present invention has been set forth by a description of an embodiment in considerable detail, it is not intended to restrict or in any way limit the claims to such detail. Additional advantages and modifications will readily appear to those who are skilled in the art. For example, the remote storage system is shown diagrammatically to have separate stores, a modem and a facsimile machine. It is not necessary for the present invention that all of those items be at the same physical location, For example, the facsimile machine could be located with the agencies and be operably connected to the agency processor 20 so that a facsimile message of the insertion order is sent approximately when the transmission data file is uploaded to the remote storage system 14. For example, instead of printing the ads at the publisher terminal as described with respect to process steps 138–144, the display ads may be directed to a subdirectory for storage or may be directed to pagination programs for use directly by composition programs. The invention in its broadest aspects is therefore not limited to the specific details shown and described. Accordingly, departures may be made from such details without departing from the spirit and scope of the invention.

What is claimed is:

1. A method of transferring data files from a plurality of agency locations to a remote data store at a remote location and from the remote data store at the remote location to a plurality of publisher locations geographically separated from both the agency and the remote locations, each of the agency locations having an agency computer operably connected to an agency data store and an agency communications device and each of the publisher locations having a publisher computer operably connected to a publisher data store and a publisher communications device, the remote location having a remote computer operably connected to remote data stores associated with each of the publisher locations and a remote communications device, the method comprising the steps of:

providing at a first agency location a first data file comprising information to be published at a selected publisher location, and an operator created second data file comprising a notification message identifying the first agency location, identifying the first data file identifying the selected publisher location and providing other information associated with publication of the information in the first data file;

storing in the agency data store of the first agency location, first data file and the second data file;

commanding an upload cycle of operation at the first agency location, the upload cycle automatically compressing the first data file to produce a compressed first data file, transmitting the compressed first data file from the first agency location to the remote location geographically separated from both the agency and the publisher locations, creating a facsimile file of the notification message in the second data file, transmitting the facsimile file from the first agency location to the remote location, sending automatically a facsimile copy of the notification message from the remote location to the selected publisher location, and storing the compressed first data file in a remote data store associated with the selected publisher location; and commanding independent of the upload cycle of operation, a download cycle of operation at the selected publisher location, the download cycle automatically and sequentially transmitting the compressed first data file from the remote location to the selected publisher location, and decompressing the compressed first data file to produce the first data file.

2. The method of claim 1 wherein the first data file is associated with a first destination with respect to the selected publisher location and the step of sending automatically the notification message facsimile file further comprises the step of sending automatically the notification message facsimile file to a second destination with respect to the selected publisher location different from the first destination.

3. The method of claim 1 wherein the download cycle of operation further includes the step of automatically providing a download confirmation associated with the first agency location, the download confirmation acknowledging receipt of the first data file by the selected publisher location.

4. The method of claim 3 wherein the remote location further includes a remote agency data store operably connected to the remote computer for each of the agency locations and step of providing the download confirmation further includes the step of storing the download confirmation in a remote agency data store associated with the first agency location.

5. The method of claim 4 wherein the upload cycle of operation further includes the step of transmitting the download confirmation from the remote agency data store associated with the first agency location to the agency computer at the first agency location.

6. A method of transferring information from a first location to a remote data store at a remote location and to a second location geographically separated from both the first and the remote locations, the first location having a first computer operably connected to I/O devices; a first data store and a first communications device and the remote location having a remote computer operably connected to a remote data store and a remote communications device, the method comprising the steps of:

creating at the first location a binary data file comprising information to be published at the second location, and a second data file comprising a notification message identifying the first location identifying the binary data file identifying the second location and providing other information associated with a publication of the information comprising the binary data file;

storing the binary data file and the second data file in the first data store of the first computer at the first location;

commanding an upload cycle of operation at the first location, the upload cycle of operation automatically transmitting the binary data file from the first location to the remote location geographically separated from both the first and the second locations, storing the binary data file in a remote data store at the remote location associated with the second location, creating in response to the second data file a facsimile file representing the notification message in the second data file, and sending in response to the facsimile file a facsimile copy of the notification message to the second location.

7. A method for transferring information from an agency location to a remote data store at a remote location and from the remote data store at the remote location to a publisher location geographically separated from both the agency and the remote locations, the agency location having an agency computer operably connected to an agency communications device, and the publisher location having a publisher computer operably connected to a publisher communications device, the agency and publisher communications devices being normally disconnected from a remote communications device at the remote location, each of the agency and publisher communications devices being in communication with the remote communications device in response to commands executed by the respective ones of the agency and publisher computers, the method comprising the steps of:

creating with the agency computer at the agency location a display ad data file representing information to be published at an associated publisher location and an insertion order data file associated with the display ad data file, the insertion order data file representing a notification message identifying the agency location, identifying the display ad data file, identifying the publisher location and providing other information associated with a publication of a display ad contained in the display ad data file;

compressing the display ad data file to produce a transmission data file;

transmitting the transmission data file from the agency computer at the agency location to a remote data store at the remote location associated with the publisher location and geographically separated from both the agency and the publisher locations;

creating an insertion order facsimile file from the insertion order create file; and sending a facsimile copy of the notification message to the publisher location in response to the insertion order facsimile file and in association with transmitting the transmission data file to the remote location.

8. The method of claim 7 wherein the publisher communications device represents a first destination within the publisher location and the step of sending the insertion order facsimile file includes the step of sending the insertion order facsimile file to a recipient at a second destination at the publisher location different from the first destination.

9. The method of claim 7 wherein the step of compressing the display ad data file further comprises the step of compressing and combining the display ad data file and the insertion order data file to produce a single transmission data file.

10. The method of claim 9 further comprising the steps of:

transmitting the single transmission data file from the remote location to the publisher location; and decompressing and separating the single transmission data file to produce the display ad data file and the insertion order data file.

11. A method for transferring information from a plurality of agency locations to a remote data store at a remote location and from the remote data store at the remote location to a plurality of publisher locations geographically separated from the plurality of the agency locations and the remote location, each of the plurality of agency locations having an agency computer terminal operably connected to an agency data store and an agency communications device and each of the plurality of publisher having a publisher computer terminal operably connected to a publisher data store and a publisher communications device, the remote location having a remote computer operably connected to remote data stores associated with each of the publisher locations and a remote communications device, the method comprising the steps of:

creating at different ones of the plurality of agency locations a plurality of display ad files, each of the plurality of display ad files representing a display ad to be published by one of the plurality of publisher locations, and a plurality of insertion order data files associated with the plurality of display ad files, each insertion order data file including insertion order data identifying one of the different ones of the plurality of agency locations, identifying one of the plurality of display ad files; identifying the one of the plurality of publisher locations, and providing other information relating to a publication of a display ad represented by the one of the plurality of display ad files;

storing the plurality of display ad files and the plurality of insertion order data files in the agency data stores of respective ones of the different ones of the plurality of agency locations;

commanding upload cycles of operation at the different ones of the plurality of agency locations, each of the upload cycles of operation automatically reading a first one of the plurality of display ad files and a respective one of the plurality of insertion order data files from the agency data stores of a respective one of the different ones of the plurality of agency locations, compressing and combining the first of the plurality of display ad files and the respective one of the plurality of insertion order data files to produce a transmission data file, creating an insertion order facsimile file corresponding to the respective, one of the plurality of insertion order data files, transmitting the transmission data file and the insertion order facsimile file from the agency communications device of the respective one of the different ones of the plurality of agency locations to the remote communications device at the remote location geographically separated from both the agency and the publisher locations, storing the transmission data file in a remote data store associated with a respective one of the plurality of publisher locations, and transmitting the insertion order facsimile file from the remote location to the respective one of the plurality of publisher locations; and commanding an independent plurality of download cycles of operation at the ones of the plurality of publisher locations, each of the plurality of download cycles of operation automatically and sequentially reading the transmission data file in the remote data store associated with the respective one of the plurality of publisher locations, transmitting the transmission data file from the remote communications device at the remote location to the publisher communications device operably connected to the publisher computer terminal at the respective one of the plurality of publisher locations, and decompressing end uncombining the transmission data file to provide the first one of the plurality of display ad files and the respective one of the plurality of insertion order data files.

12. An apparatus for transferring binary display ad files representing information to be published between a plurality of ad agencies and a plurality of publishers geographically separated from the ad agencies, the apparatus comprising:

a remote computer at a remote location geographically separated from both the ad agencies and the publishers, the remote computer being operably connected to a plurality of remote data stores with at least one remote data store being associated with each of the publishers, and the remote computer being operably connected to a remote communications device and a device for sending facsimile copies to the publishers;

a plurality of agency computer terminals, each of the plurality of agency computer terminals located at one of the plurality of ad agencies including agency I/O circuits for inputting an insertion order file associated with each of the binary display ad files, each insertion order file including notification data identifying a respective one of the plurality of ad agencies, identifying an associated one of the binary display ad files, and providing Other information associated with a publication of information included in the associated one of the binary display ad files, an agency data store for storing the binary display ad files and associated insertion order files;

an agency communications device connectable with the remote communications device;

an agency processor means connected to the agency I/O circuits the agency data store and the agency communications device for, reading in response to a first input signal one of the binary display ad files and one of the insertion order files from the agency data store each of the binary display ad files being associated with one of the publishers, compressing and combining the one of the binary display ad files and the one of the insertion order files to produce a transmission data file, connecting the first communications device with the remote communications device, transmitting the transmission date file to the remote data stores at the remote location corresponding to the publishers associated with the one of the binary display ad files, creating an insertion order facsimile file from the insertion order file, transmitting the insertion order facsimile file to the remote location, and causing the device at the remote location to send a facsimile copy of the insertion order data in the insertion order facsimile file to the one of the publishers; and a plurality of publisher computer terminals, each of the plurality of publisher computer terminals located at one of the plurality of publishers including publisher I/O circuits for producing second input signals, a publisher data store, a publisher communications device connectable with the remote communications device, a publisher processor means connected to the publisher I/O circuits, the publisher data store and the publisher communications device for receiving in response to one of the second input signals, transmission data file from remote data store associated with a respective publisher, decompressing and separating the transmission data file to produce a first binary display ad file and a first insertion order file associated with the respective publisher, and storing the the first binary display ad file and the first insertion order file in the publisher data store.

13. The apparatus of claim 12 wherein each of the plurality of publisher computer terminals further comprises a printer for printing the decompressed binary display ad files.

14. A method of transferring information from a plurality of agency locations to a remote location and from the remote location to a plurality of publisher locations geographically separated from both the agency and the remote locations, the method comprising the steps of:

providing at a first agency location a first data file comprising information to be published at a selected publisher location, and a second data file comprising a notification message identifying the first agency location, identifying the first data file, identifying the selected publisher location and providing other information associated with a publication of the information to be published included within the first data file;

compressing at the first agency location the first data file to produce a compressed data file;

creating at the first agency location a facsimile file from the second data file;

transmitting the compressed data file from the first agency location to the remote location geographically separated from both the agency and the publisher locations;

storing the compressed data file in a remote data store at the remote location associated with the selected publisher location;

sending a facsimile copy of the notification message contained in the facsimile file to the selected publisher location;

transmitting the compressed data file from the remote location to selected publisher location; and decompressing the compressed data file to produce the first data file.

15. The method of claim 14 wherein the step of compressing the first date file further comprises the step of compressing and combining the first data file and the second data file into a single compressed data file, and the step of decompressing the compressed data file further comprises decompressing and uncombining the compressed data file to produce the first data file and the second data file.

* * * * *

UNITED STATES PATENT AND TRADEMARK OFFICE
CERTIFICATE OF CORRECTION

PATENT NO. : 5,523,854
DATED : June 4, 1996
INVENTOR(S) : Warren G. Hornsby

It is certified that error appears in the above-indentified patent and that said Letters Patent is hereby corrected as shown below:

Column 7, line 11, after "connect", insert --the--.

Column 10, line 1, delete ""COMPUSERVE°"" and insert therefor --COMPUSERVE®"".

Column 10, line 3, delete "computer" and insert therefor --computers. The insertion--.

Column 10, line 17 and 18, delete "and is attached hereto as Appendices 1 and 2, respectively".

<u>In the claims</u>:

Column 10, line 67, before "first" insert --the--.

Column 12, line 2, after "location;" insert --and--.

UNITED STATES PATENT AND TRADEMARK OFFICE
CERTIFICATE OF CORRECTION

PATENT NO. : 5,523,854
DATED : June 4, 1996
INVENTOR(S) : Warren G. Hornsby

It is certified that error appears in the above-indentified patent and that said Letters Patent is hereby corrected as shown below:

Column 12, line 50, delete "create" and insert --data--.

Column 13, line 14, after "publisher", insert --locations--.

Column 14, line 13, delete "end" and insert --and--.

Column 16, line 22, after "to", insert --the--.

Column 16, line 26, delete "date" and insert --data--.

Signed and Sealed this

Twenty-second Day of April, 1997

Attest:

BRUCE LEHMAN

*Attesting Officer*   *Commissioner of Patents and Trademarks*